(No Model.)
G. H. READ.
CAMERA STAND.
No. 355,413. Patented Jan. 4, 1887.
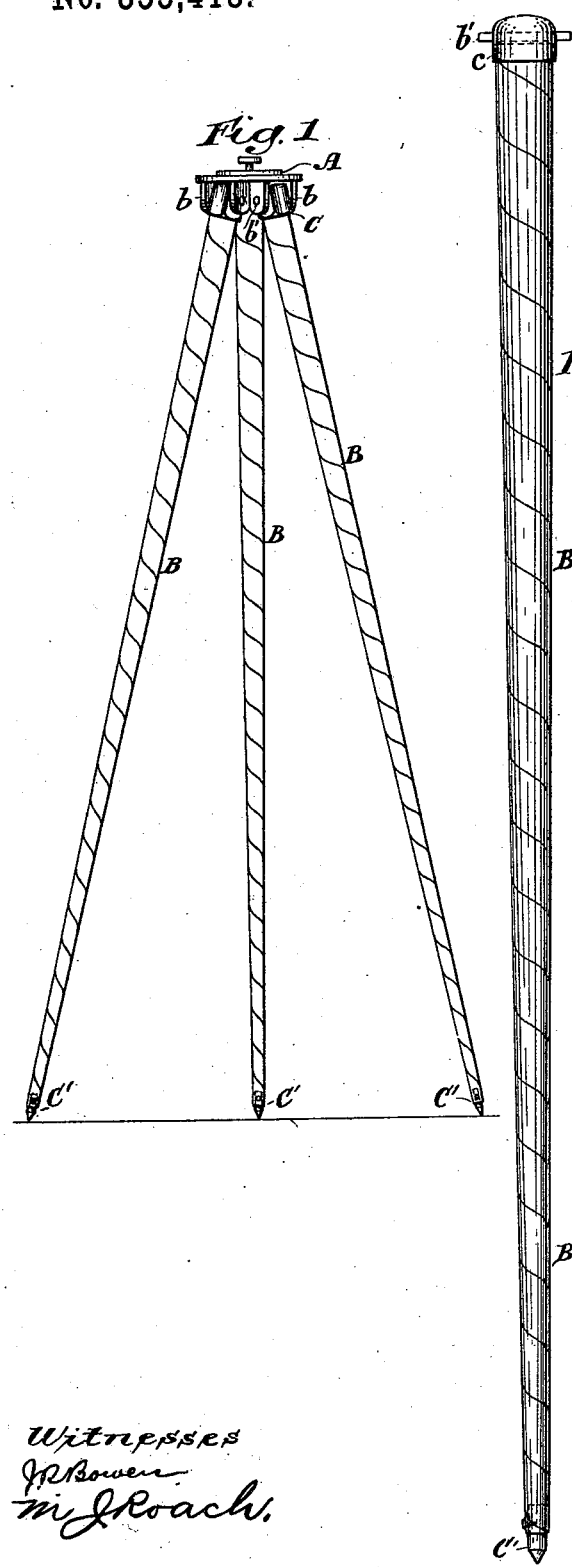
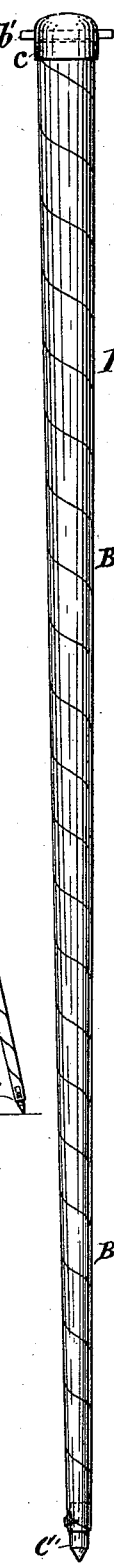
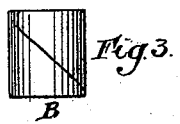
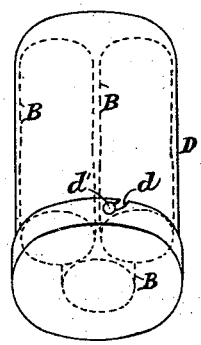
Witnesses
JR Bowen
M J Roach
Inventor
George H. Read,
by his attorneys,
Gifford & Brown
N. PETERS, Photo-Lithographer, Washington, D. C.

UNITED STATES PATENT OFFICE.

GEORGE H. READ, OF BROOKLYN, NEW YORK.

CAMERA-STAND.

SPECIFICATION forming part of Letters Patent No. 355,413, dated January 4, 1887.

Application filed November 23, 1886. Serial No. 219,541. (No model.)

*To all whom it may concern:*

Be it known that I, GEORGE H. READ, of Brooklyn, Kings county, and State of New York, have invented a certain new and useful Improvement in Camera-Stands, of which the following is a specification.

The object of my improvement is to produce camera-stands which may be more compactly packed for transportation, when not in use, than those now commonly made.

To this end my improvement consists in a camera-stand having legs severally composed of strips of steel or analogous material spirally coiled in such manner as to form a tendency to extend out transversely to the direction in which it is coiled, and at the same time to expand diametrically, and having combined therewith caps for limiting the extension and expansion. The strip may be coiled tightly and contracted, so that each coil will fit within another, and then may be packed in very small space. The caps at the upper end of the strips forming the legs are pivoted to a head in any suitable manner.

In the accompanying drawings, Figure 1 is a side view of a camera-stand made in the form of a tripod and embodying my improvement. Fig. 2 is a side view of one of the legs thereof extended. Fig. 3 is a side view of one of the legs contracted. Fig. 4 is a perspective view of a box or case for containing the three legs of the stand after said legs have been detached and contracted.

Similar letters of reference designate corresponding parts in all the figures.

A designates the head or top part of the camera-stand. It may be made of any suitable form for supporting a camera, and will be provided with means whereby the camera may be detachably secured to it. It will preferably be made of metal. It has extending from its under side pairs of lugs $b$, between which are pivoted by pins $b'$ caps C.

The legs B are severally made of strips of steel or other metal coiled spirally and in such manner that it will have a tendency not only to expand diametrically, but extend outward in a direction transverse to the direction of the coils. Therefore, whenever such strip is not prevented from so doing it will extend out to form a long leg, as shown in Fig. 2. If after its extension it be tightly coiled circumferentially without forcing its coils together, and subsequently is fitted into its cap C, the said cap will thereafter maintain it in such condition, and it will then be quite rigid and will serve well to support the camera. When the use of the camera is ended the legs B may be pulled out of the caps C and may be forced together endwise, so that their coils will be all one within another, and they may be also coiled more tightly, so that they will be shortened and decreased in size diametrically to fit within compartments of a box or case, D, in which they belong. When inserted in this box or case the cover of the latter will be placed in its proper position and fastened by a suitable catch or catches. I have shown catches consisting of slots $d$ and headed buttons or pins $d'$. These catches are of a kind known as "bayonet" lock-catches, and enable the cover to be disengaged by twisting it circumferentially and then moving it or allowing it to move lengthwise of the body of the box or case. The reverse action will engage the cover with the body of the box or case. When the cover is fastened the box or case will of course prevent the legs from expanding.

The lower ends of the legs will have cylindric pieces C' fastened to them, so as to prevent them from expanding or contracting diametrically at that point. These pieces C may be permanently fastened to the legs, and may be formed like spikes for preventing the legs from slipping when placed upon the ground.

The legs may be adjusted to have somewhat different lengths by allowing them to extend longitudinally, and then coiling them tightly and fitting their upper ends into the caps C.

It will be seen by my improvement I provide a camera-stand which may be compactly packed when no longer needed for use.

What I claim as my invention, and desire to secure by Letters Patent, is—

1. A camera-stand having legs severally composed of a strip of steel or other suitable metal spirally coiled and so constituted that it will have a tendency to expand diametrically and extend in a direction transverse to the direction of its coils, substantially as specified.

2. A camera-stand having legs severally composed of a strip of steel or like metal spirally coiled and so constituted that it will have a tendency to expand diametrically and extend in a direction transverse to its coils and caps, combined with the strips, substantially as specified.

3. A camera-stand having the following parts in combination, namely: a head for the support of a camera, caps pivotally connected to said head, strips of steel or like metal spirally coiled and so constituted that they will have a tendency to expand diametrically and extend in a direction transverse to their coils and adapted to be fitted into said caps, substantially as specified.

GEORGE H. READ.

Witnesses:
D. H. DRISCOLL,
MAURICE J. ROACH.